US011015673B2

(12) United States Patent
Tull De Salis et al.

(10) Patent No.: US 11,015,673 B2
(45) Date of Patent: May 25, 2021

(54) TORSIONAL VIBRATION DAMPER AND ARRANGEMENT FOR THE DRIVETRAIN OF A MOTOR VEHICLE WITH SUCH A TORSIONAL VIBRATION DAMPER

(71) Applicant: BorgWarner Inc., Auburn Hills, MI (US)

(72) Inventors: Rupert Stephen Tull De Salis, Heidelberg (DE); Marco Guckelmus, Mannheim (DE); Roshan Jethwa, Mannheim (DE); Marco Valentin Kachler, Walldorf (DE); Sebastian Zindel, Seeheim-Jugenheim (DE); Hans Juergen Hauck, Schwaebish Hall (DE); Jochen Boeling, Baden-Baden (DE)

(73) Assignee: BorgWarner Inc., Auburn Hills, MI (US)

( * ) Notice: Subject to any disclaimer, the term of this patent is extended or adjusted under 35 U.S.C. 154(b) by 79 days.

(21) Appl. No.: 16/327,964

(22) PCT Filed: Aug. 29, 2017

(86) PCT No.: PCT/US2017/049031
§ 371 (c)(1),
(2) Date: Feb. 25, 2019

(87) PCT Pub. No.: WO2018/044844
PCT Pub. Date: Mar. 8, 2018

(65) Prior Publication Data
US 2019/0186591 A1 Jun. 20, 2019

(30) Foreign Application Priority Data
Aug. 31, 2016 (DE) .......................... 102016010484.8

(51) Int. Cl.
*F16F 15/139* (2006.01)
*F16D 3/14* (2006.01)
(Continued)

(52) U.S. Cl.
CPC ............ *F16F 15/1392* (2013.01); *F16D 3/14* (2013.01); *F16D 25/082* (2013.01); *F16D 47/02* (2013.01); *F16F 15/123* (2013.01)

(58) Field of Classification Search
CPC . F16D 3/12; F16D 3/14; F16D 25/082; F16D 25/0287; F16D 2300/22;
(Continued)

(56) References Cited

U.S. PATENT DOCUMENTS 5,046,591 A * 9/1991 Hageman ................ F16H 45/02
  192/214.1
6,068,098 A * 5/2000 Yamamoto ............ F16F 15/126
  192/209
(Continued)

FOREIGN PATENT DOCUMENTS

DE 102006023288 A1 11/2007
DE 102013216510 A1 3/2014
(Continued)

OTHER PUBLICATIONS

English language abstract for WO 2009/018801 extracted from espacenet.com database on Mar. 28, 2019, 2 pages.
(Continued)

*Primary Examiner* — Richard M Lorence
(74) *Attorney, Agent, or Firm* — Howard & Howard Attorneys PLLC

(57) ABSTRACT

The present invention relates to a torsional vibration damper (18) comprising a first component (20) and a second component (22) which are torsionally elastically coupled to one another, wherein a force transmission device (26) is pro-
(Continued)

vided for transmitting an actuating force from the one axial side (48) of the torsional vibration damper (18) to the opposite axial side (50) of the torsional vibration damper (18) to a device (54) to be actuated. In addition, the present invention relates to an arrangement (2) for the drivetrain of a motor vehicle comprising such a torsional vibration damper (18).

17 Claims, 1 Drawing Sheet

(51) Int. Cl.
    *F16F 15/123*     (2006.01)
    *F16D 25/08*     (2006.01)
    *F16D 47/02*     (2006.01)

(58) Field of Classification Search
    CPC ... F16D 47/02; F16F 15/123; F16F 15/12373; F16F 15/129; F16F 15/1292; F16F 15/139; F16F 15/1392
    See application file for complete search history.

(56) References Cited

U.S. PATENT DOCUMENTS

| | | | |
|---|---|---|---|
| 8,967,353 B2 * | 3/2015 | Roses | F16D 25/082 192/55.61 |
| 2004/0226794 A1 | 11/2004 | Sasse et al. | |
| 2007/0267265 A1 | 11/2007 | Sudau et al. | |
| 2009/0151344 A1 | 6/2009 | Degler et al. | |
| 2010/0133063 A1 | 6/2010 | Degler | |
| 2015/0013488 A1 | 1/2015 | Matsuoka et al. | |
| 2016/0025147 A1 | 1/2016 | Dinger | |
| 2016/0178030 A1 | 6/2016 | Dinger et al. | |

FOREIGN PATENT DOCUMENTS

| | | | |
|---|---|---|---|
| DE | 112013002081 T5 | | 1/2015 |
| JP | 01275920 A | * | 11/1989 |
| WO | 2009018801 A1 | | 2/2009 |

OTHER PUBLICATIONS

International Search Report for Application No. PCT/US2017/049031 dated Dec. 12, 2017, 4 pages.

English language abstract for DE 10 2006 023 288 extracted from espacenet.com database on Jul. 23, 2020, 1 page.

English language abstract and machine-assisted English translation for DE 10 2013 216 510 extracted from espacenet.com database on Jul. 23, 2020, 11 pages.

Machine-assisted English language abstract for DE 11 2013 002 081 T5 extracted from espacenet.com database on Jul. 23, 2020, 4 pages.

* cited by examiner

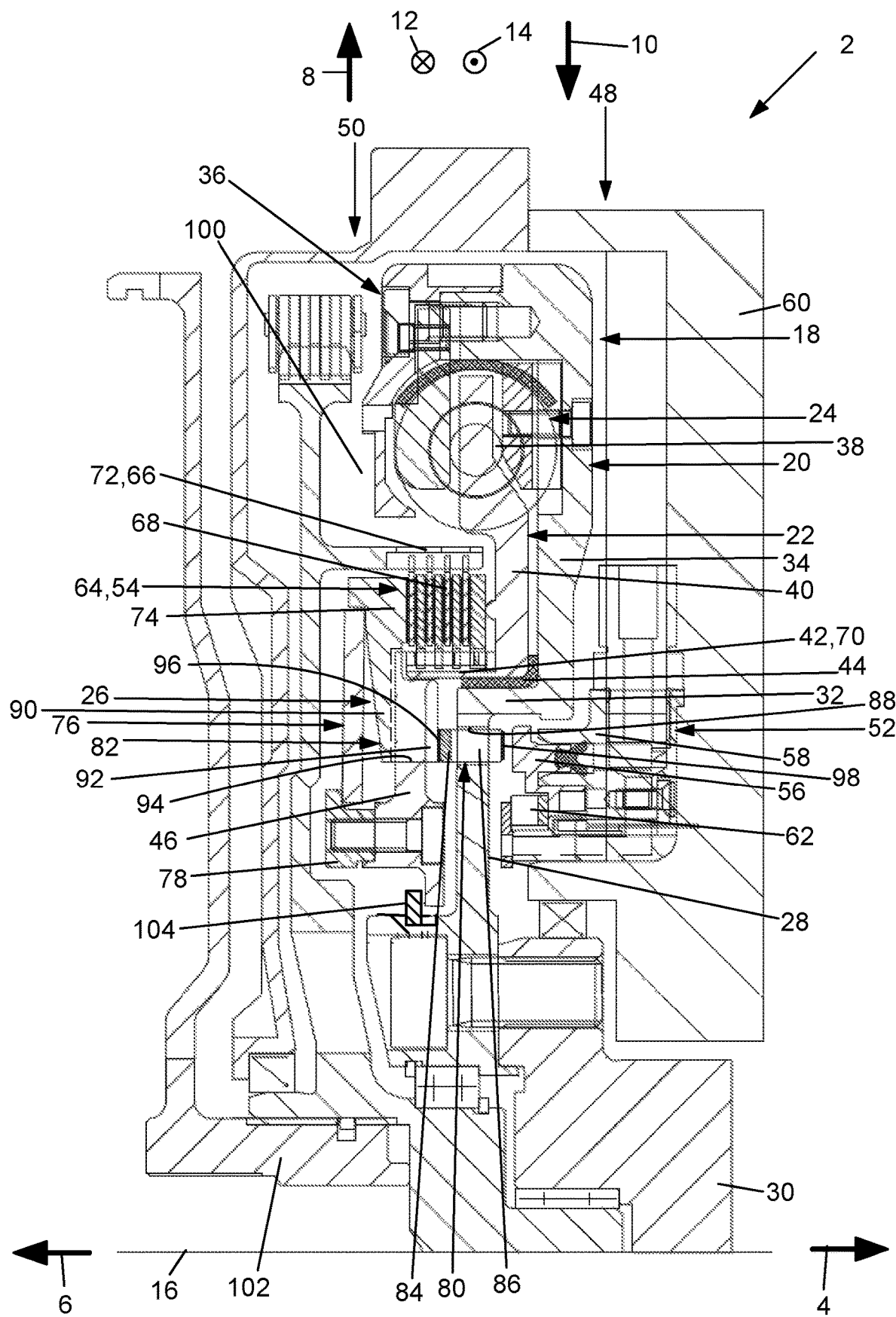

TORSIONAL VIBRATION DAMPER AND ARRANGEMENT FOR THE DRIVETRAIN OF A MOTOR VEHICLE WITH SUCH A TORSIONAL VIBRATION DAMPER

CROSS-REFERENCE TO RELATED APPLICATIONS

The present application is the National Stage of International Patent Application No. PCT/US2017/049031, filed on Aug. 29, 2017, which claims priority to and all the benefits of German Application No. 10 2016 010 484.8, filed on Aug. 31, 2016, which are hereby expressly incorporated herein by reference in their entirety.

The present invention relates to a torsional vibration damper comprising a first component and a second component which are torsionally elastically coupled to one another. In addition, the present invention relates to an arrangement for the drivetrain of a motor vehicle comprising such a torsional vibration damper.

Torsional vibration dampers are known from practice which are composed of a first component and a second component which are torsionally elastically coupled to one another in order to suppress torsional vibrations or rotational vibrations within the drivetrain of a motor vehicle. Actuating devices, for example, a hydraulically drivable piston-cylinder arrangement, and devices to be actuated, for example, a clutch device, wherein an actuating force from the actuating device may be applied to the device to be actuated, are also provided within the known drivetrains with such a torsional vibration damper. In the known drivetrains, the actuating device is arranged together with the device to be actuated either on one axial side or on the other opposite axial side of the torsional vibration damper.

The known torsional vibration dampers have the disadvantage that a flexible arrangement of the torsional vibration damper in relation to the device to be actuated and to the actuating device is scarcely possible so that the known torsional vibration dampers limit the design configuration freedom when designing a drivetrain. In addition, the known torsional vibration dampers require a relatively intensive use of installation space in the structure of the drivetrain into which they are integrated.

It is therefore one object of the present invention to refine a torsional vibration damper of the generic type in such a way that a relatively flexible arrangement of the same within the drivetrain is possible, and a compact structure of the damper and the drivetrain may be achieved. Additionally, the object underlying the present invention is to create an arrangement for the drivetrain of a motor vehicle with an advantageous torsional vibration damper of this type.

This problem is solved by the features listed in Patent Claim 1 or 9. Advantageous embodiments of the invention are the subject matter of the subclaims.

The torsional vibration damper according to the invention has a first component and a second component. The first component may, for example, be designed as the primary or secondary element or the input or output side of the torsional vibration damper, while the second component may, for example, be designed as the secondary or primary element or the output or input side of the torsional vibration damper. The first component and the second component are torsionally elastically coupled to one another to achieve a damping of torsional or rotational vibrations. The torsionally elastic coupling may, for example, be accomplished by spring devices or other energy stores acting between the first and second components. A force transmission device is assigned to the torsional vibration damper to transmit an actuating force from the one axial side of the torsional vibration damper to the opposite axial side of the torsional vibration damper, so that, for example, an actuating force is transmittable from the one axial side to the opposite axial side to a device to be actuated, for example, a clutch device. The torsional vibration damper thus enables a substantially more flexible arrangement of the same within a drivetrain. Thus, for example, an actuating device for generating an actuating force may be arranged on the one axial side of the torsional vibration damper, while the device to be actuated may be arranged on the opposite side of the torsional vibration damper, wherein the actuating force may be transmitted from the actuating device on the one side via the torsional vibration damper to the device to be actuated on the other side. It has also been shown that by this means a significantly more compact structure of the drivetrain may be achieved.

In one preferred embodiment of the torsional vibration damper according to the invention, the force transmission device interacts with the first and second components in such a way that the actuating force may be applied to the force transmission device while impeding a relative rotation between the first and second components. This is advantageous insofar as the force transmission device may satisfy two functions. On the one hand, it functions to transmit the actuating force, on the other hand, it is used to impede the relative rotation between the first and second components during the application of the actuating force, which may be desirable depending on the operating state of the drivetrain. Based on the latter function, a potentially necessary device for targeted or controlled impediment of the relative rotation between the first and second components may additionally be omitted, so that a particularly compact and space-saving structure may be achieved, or at least unloaded in such a way that such an additional device may be designed to be particularly small, or does not primarily function to impede the relative rotation, but instead axially supports the first and second components on one anther. Impeding the relative rotation between the first and second components may thereby be understood, for example, as making such a relative rotation more difficult up to preventing such a relative rotation.

To achieve a particularly simple structure of the torsional vibration damper or the force transmission device, the force transmission device in one particularly preferred embodiment of the torsional vibration damper according to the invention interacts with the first and second components in such a way that the actuating force may be applied to the force transmission device to achieve a friction-based impediment of the relative rotation between the first and second components. This is advantageous insofar as the degree of the impediment of the relative rotation between the first and second components may be controlled in a targeted way by the degree or size of the actuating force.

In one advantageous embodiment of the torsional vibration damper according to the invention, the force transmission device has a first force transmission element which is displaceable relative to the first component and is in rotary driving connection with the first component, and a second force transmission element, designed as separate from the first force transmission element and supported or supportable on the first force transmission element, said second force transmission element is displaceable relative to the second component and is in rotary driving connection with the second component. Due to the separate design of the first and second force transmission elements, the relative rotation between the first and second components is considered, wherein the relative rotation may also be referred to as relative rotational vibration. In this embodiment, it is additionally preferred if the two force transmission elements are each displaceable in the axial direction relative to the respective component of the torsional vibration damper.

In one particularly advantageous embodiment of the torsional vibration damper according to the invention, the relative rotation between the first and second components is impeded by friction between the first force transmission element and the second force transmission element when the actuating force is applied to the force transmission device and the two components rotate or vibrate relative to one another.

To avoid wear on the force transmission elements and, if necessary, to increase the previously mentioned friction between the first and second force transmission elements, a friction element is arranged between the first force transmission element and the second force transmission element in another advantageous embodiment of the torsional vibration damper according to the invention. It is hereby preferred if the friction element is fixed on the first force transmission element or on the second force transmission element. In addition, it has proven advantageous to use a friction element in the form of a friction lining, if necessary, in the form of a paper friction lining. The friction lining may likewise be formed by a sintered friction lining. In the case of a friction lining or paper friction lining, this is preferably glued to the respective force transmission element. The term friction element also includes friction elements in the form of a friction layer, which is formed as one piece with one of the force transmission elements and was preferably produced by a corresponding surface treatment or material treatment of the respective force transmission element.

To protect the first force transmission element of the force transmission device from wear when the actuating force of an actuating device is applied to the force transmission element, a sliding element is preferably provided via which the actuating force of an actuating device may be applied to the first force transmission element. The sliding element preferably also has a friction reducing effect so that only low friction forces may occur between the first force transmission element of the force transmission device and an actuating element of an actuating device. This is advantageous in particular when an actuating element of an actuating device is designed as stationary or not jointly rotating in the circumferential direction, in contrast to the first force transmission element, particularly as by this means a deceleration of the first component in rotary driving connection with the first force transmission element is prevented. Such a sliding element may, for example, also be formed by a release bearing. In this embodiment, it is additionally preferred if the sliding element is fixed on the first force transmission element, and particularly preferably is formed by a sliding lining, wherein such a sliding lining is then, if necessary, permanently glued to the first force transmission element. The term sliding element also includes sliding elements in the form of a sliding layer, which is designed as one piece with the first force transmission element or the actuating element of the actuating device, and was preferably produced by a corresponding surface treatment or material treatment of the first force transmission element or the actuating element.

In another advantageous embodiment of the torsional vibration damper according to the invention, the first force transmission element extends through recesses in the first component to achieve the rotary driving connection. The recesses are preferably designed like windows, wherein it is additionally preferred if the recesses are provided spaced apart from one another in the circumferential direction in the first component. It is additionally advantageous if the recesses extend through the first component in the axial direction, consequently preferably in a radial section of the first component.

Alternatively or supplementally to the previously described embodiment, the second force transmission element extends through, preferably window-like, recesses in the second component to achieve the rotary driving connection, wherein the recesses are particularly preferably provided spaced apart from one another in the circumferential direction in the second component. It is also preferred in this case if the recesses extend through the second component in the axial direction, consequently preferably in a radial section of the second component.

In another advantageous embodiment of the torsional vibration damper according to the invention, the first force transmission element has a base section and support fingers arranged on the base section, and the support fingers extend through the recesses in the first component. In this embodiment, it is preferred if the base section is designed in a ring shape. In addition, it has proven advantageous, if the support fingers extend in the axial direction through the recesses in the first component and/or are designed as axial fingers.

In another advantageous embodiment of the torsional vibration damper according to the invention, the second force transmission element has, if necessary, an annular base section and support fingers arranged on the base section, and the support fingers extend through the recesses in the second component, wherein the support fingers are preferably designed as axial fingers and/or extend in the axial direction through the recesses in the second component.

In another preferred embodiment of the torsional vibration damper according to the invention, the base sections of the force transmission elements are supported or supportable on one another. By this means, a relatively large contact surface may exist between the two force transmission elements, not only to reduce surface pressure but also to increase the previously mentioned friction between the force transmission elements.

In another preferred embodiment of the torsional vibration damper according to the invention, which represents an alternative to the previously described embodiment, the support fingers of the one force transmission element are supported or supportable on the base section of the other force transmission element.

The arrangement for the drivetrain of a motor vehicle according to the invention has a torsional vibration damper of the previously described type according to the invention.

In one preferred embodiment of the arrangement according to the invention, the arrangement has an actuating device which is arranged on a first axial side of the torsional vibration damper and functions to apply an actuating force to the force transmission device. It is hereby preferred if the actuating device functions to apply the actuating force to the first force transmission element of the force transmission device.

Alternatively or supplementally to the previously described embodiment, the arrangement in another preferred embodiment of the invention has a device to be actuated which is arranged on a second axial side of the torsional vibration damper and to which an actuating force may be transmitted via the force transmission device of the torsional vibration damper.

In one particularly preferred embodiment of the arrangement according to the invention, the device to be actuated is translatable from a first operating state into a second operating state. An actuating force below a predetermined actuating force threshold value may thereby be applied to the force transmission device to impede the relative rotation between the first and second components and to maintain the first operating state of the device to be actuated. In addition, an actuating force above the predetermined actuating force threshold value may thereby be applied to the force transmission device to impede, if necessary to prevent, the relative rotation between the first and second components and to achieve the second operating state of the device to be actuated. Consequently, the force transmission device may be used in a targeted way to influence the relative rotation between the first and second components, whereas the first operating state of the device to be actuated is maintained only if an actuating force is applied which remains below the specified predetermined force actuation threshold value. If, in contrast, the device to be actuated is to be translated into the specified second operating state, then this may be effected using an actuating force above the predetermined force actuation threshold value, wherein at the same time the relative rotation between the first and second components is also influenced or impeded, when not completely prevented. Due to this dual function of the force transmission device, another device for impeding the relative rotation between the first and second components may be omitted in order to achieve a particularly space-saving installation and compact structure of the arrangement.

In another advantageous embodiment of the arrangement according to the invention, a reset device for generating a reset force counteracting the actuating force in order to bias the device to be actuated into the first operating state, is assigned to the device to be actuated and/or to the force transmission device. The reset device may, for example, be a spring device; it may also be a disk spring device in the sense of a particularly compact design.

In one particularly advantageous embodiment of the arrangement according to the invention, the predetermined actuating force threshold value corresponds in terms of amount to the value of the reset force which is generated by the reset device.

In another advantageous embodiment of the arrangement according to the invention, the device to be actuated is a clutch device. The clutch device is preferably a disk clutch. In addition, it is preferred in this embodiment if the clutch device functions for selective torque transmission between the first or second component of the torsional vibration damper and an output side of the clutch device.

In another advantageous embodiment of the arrangement according to the invention, the clutch device, which is designed as the device to be actuated, is closed in the previously mentioned first operating state and opened in the second operating state. Consequently, this embodiment is a normally closed clutch device.

In another advantageous embodiment of the arrangement according to the invention, the clutch device, which is designed as the device to be actuated, is arranged together with the torsional vibration damper in a common wet space. The clutch device is thus designed as a wet clutch.

In another particularly preferred embodiment of the arrangement according to the invention, the actuating device has an actuating element interacting and drivable with the force transmission device. The actuating element, preferably displaceable in the axial direction, is preferably stationary in the circumferential direction. The previously mentioned sliding element, via which the actuating force may be applied by the actuating element to the first force transmission element, is thereby preferably fixed on the actuating element, provided that the fixing is not carried out on the first force transmission element of the force transmission device itself.

In another advantageous embodiment of the arrangement according to the invention, the actuating element, interacting and drivable with the force transmission device, if necessary the first force transmission element of the force transmission device, is a hydraulically drivable actuating piston or actuating ring piston. Consequently, a hydraulic actuating device may also be discussed in the case of the actuating device.

The invention will be subsequently described in greater detail with the aid of an exemplary embodiment with reference to the appended drawing. The single FIGURE shows a partial side view of one embodiment of the arrangement for the drivetrain of a motor vehicle comprising a torsional vibration damper.

FIG. 1 shows an arrangement 2 for the drivetrain of a motor vehicle. In the FIGURE, the opposite axial directions 4, 6, the opposite radial directions 8, 10, and the opposite circumferential directions 12, 14 of arrangement 2 of the torsional vibration damper, described later in greater detail, are indicated by corresponding arrows. The axis of rotation of arrangement 2 or the torsional vibration damper extends in axial directions 4, 6.

As already mentioned at the outset, arrangement 2 has a torsional vibration damper 18. Torsional vibration damper 18 is composed essentially of a first component 20, which may also be referred to as the primary element or input side of torsional vibration damper 18, a second component 22, which may also be referred to as the secondary element or output side of torsional vibration damper 18, and a spring device 24, wherein first component 20 and second component 22 are torsionally elastically coupled to one another via spring device 24 in circumferential direction 12, 14 such that these components may execute a relative rotation about axis of rotation 16 in a predetermined rotational angle range counter to the reset force of spring device 24. In addition, a force transmission device 26 is assigned to torsional vibration damper 18.

First component 20 has a stepped radial profile in axial direction 4, 6. Thus, first component 20 has an inner radial section 28, which is directly or indirectly fastened rotationally fixed on output side 30 of an internal combustion engine, not shown in greater detail, where output side 30 shown here is formed, by way of example, from the crankshaft end of the internal combustion engine. Inner radial section 28 extends outward in radial direction 8 up to an axial section 32, which extends, starting from inner radial section 28, in axial direction 4. An outer radial section 34 of first component 20, extending outward in radial direction 8, connects to the end of axial section 32 facing in radial direction 4. An accommodation housing 36 connects in radial direction 8 to the outer end of outer radial section 34, the accommodation housing delimits an accommodation space 38 for spring device 24 in axial directions 4, 6 and outward in radial direction 8, wherein accommodation space 38 is open inwardly in radial direction 10. Accommodation space 38 extends essentially in circumferential directions 12, 14.

Second component 22 of torsional vibration damper 18 has a stepped radial profile in axial direction 4, 6. Thus, second component 22 has an outer radial section 40 which extends outward in radial direction 8 via drivers up to accommodation space 38 and runs inward in radial direction 10 up to an axial section 42 of second component 22. Axial section 42 connects in radial direction 10 to outer radial section 40, extending therefrom starting in axial direction 6. As is clear from the FIGURE, axial section 42 is supported in radial direction 10 on axial section 32 of first component 20, wherein this is carried out via an annular support part 44 fixed on first component 20 or second component 22. Generally stated, second component 22 is supported or mounted in radial direction 10 on first component 20, wherein this is carried out slidingly or via a slide bearing, as shown in the FIGURE. An inner radial section 46, which extends, starting from axial section 42 inward in radial direction 10, connects to the end of axial section 42 facing in axial direction 6.

Two opposite axial sides, namely a first axial side 48 in axial direction 4 to the right of torsional vibration damper 18 and a second axial side 50 in axial direction 6 to the left of torsional vibration damper 18, are thus assigned to torsional vibration damper 18 arranged in such a way within arrangement 2. Thus, an actuating device 52, which functions to generate an actuating force, is arranged in arrangement 2 on first axial side 48, whereas a device 54 to be actuated, on which the actuating force from actuating device 52 may be transmitted via previously mentioned force transmission device 26, is arranged on opposite, second axial side 50. In other words, actuating force may be applied to force transmission device 26 by actuating device 52, whereas this actuating force may be applied to device 54 to be actuated via force transmission device 26.

From the preceding description, it is clear that force transmission device 26 functions to transmit an actuating force from first axial side 48 of torsional vibration damper 18 to opposite axial side 50 of torsional vibration damper to device 54 to be actuated, wherein actuating device 52 and device 54 to be actuated are to be described in greater detail before the structure of force transmission device 26 is discussed.

Actuating device 52 is designed as hydraulic actuating device 52. Thus, actuating device 52 has a hydraulically drivable actuating element 56, which is designed in this case as a type of hydraulically drivable actuating piston or actuating ring piston. Piston-type actuating element 56 is arranged in a stationary cylinder 58 of hydraulic actuating device 52 such that actuating element 56 is displaceable in axial direction 4, 6. Actuating element 56 in the form of the actuating piston or the actuating ring piston is thereby stationary in circumferential direction 12, 14 such that actuating element 56 is rotatable only in a limited range or not at all in specified circumferential directions 12, 14. Cylinder 58 of actuating device 52 is fixed on stationary housing 60 indicated in the FIGURE, if necessary on housing 60 of the internal combustion engine, and/or designed as one piece with the same.

Actuating element 56 interacts with the end of force transmission device 26 protruding in axial direction 4 at first axial side 48 when actuating element 56 is displaced in axial direction 6 against force transmission device 26 by the application of pressure from cylinder 58. Until then, actuating element 56 is recessed in the starting position shown in the FIGURE via a spring device 62, in which position actuating element 56 preferably does not contact force transmission device 26.

Device 54 to be actuated is a clutch device 64 in the embodiment shown, which is designed as a disk clutch and functions for selective torque transmission between second component 22 and an output side 66. Thus, clutch device 64 has a disk set 68 made from inner and outer disks, wherein an inner disk carrier 70, which is essentially formed by axial section 42 of second component 22 and is designed as the input side of clutch device 64, is assigned to the inner disks, and an outer disk carrier 72, which represents previously mentioned output side 66 of clutch device 64 is assigned to the outer disks. In addition, a pressure plate 74 is assigned to disk set 68 on the end in axial direction 6, the pressure plate is displaceable in axial direction 4, 6 and is pressed or pressible against disk set 68 in axial direction 4, wherein disk set 68 may be supported in axial direction 4 on outer radial section 40 of second component 22. Pressure plate 74 is designed as one piece with a force transmission element, to be described later in greater detail with force transmission device 26.

Clutch device 64 is essentially translatable from a first operating state, in which clutch device 64 is closed, into a second operating state, in which clutch device 64 is open. Device 54 to be actuated, in the form of clutch device 64, is thereby biased via a reset device 76, which functions to generate a reset force in the specified first operating state in which clutch device 64 is closed. In the embodiment shown, reset device 76 is supported in axial direction 6 on inner radial section 46 by means of a support ring 78 detachably fixed on inner radial section 46 of second component 22, and on pressure plate 74 in opposite axial direction 4. Reset device 76 is thereby essentially formed by a spring device, for example, the disk spring shown in the FIGURE. The reset force exerted by reset device 76 also acts in axial direction 4 and thus counter to the actuating force of actuating device 52, as this is explained again later in greater detail.

Force transmission device 26 is essentially composed of a first force transmission element 80 and a second force transmission element 82. First force transmission element 80 is displaceable in axial direction 4, 6 relative to first component 20 of torsional vibration damper 18, wherein first force transmission element 80 is in rotary driving connection with first component 20. Thus, first force transmission element 80 has an annular base section 84 which extends in circumferential directions 12, 14, wherein support fingers 86 are arranged on base section 84 which extend, starting from base section 84 in axial direction 4 and are arranged spaced apart from one another in circumferential direction 12, 14 on base section 84. Support fingers 86 thereby extend through window-like openings 88 in inner radial section 28 of first component 20 to achieve the rotary driving connection with first component 20, wherein recesses 88 are arranged spaced apart from one another in circumferential direction 12, 14 in inner radial section 28. In the embodiment shown, annular base section 84 is thus arranged in axial direction 6 next to first component 20, while the free ends of support fingers 86 extend through specified recesses 88 up to the side of first component 20 facing in axial direction 4, consequently up to first axial side 48.

Second force transmission element 82 has a similar structure. Thus, second force transmission element 82, which is designed as separate from first force transmission element 80, yet is supported or supportable in axial direction 4 on first force transmission element 80, is displaceable in axial directions 4, 6 relative to second component 22 of torsional vibration damper 18. It is thus in rotary driving connection with second component 22. Second force transmission element 82 also has an annular base section 90 which is designed circumferentially in circumferential directions 12, 14, and has support fingers 92, arranged on base section 90, extending, starting from base section 90, in axial direction 4. To be able to support the second force transmission element on first force transmission element 80, specified support fingers 92 extend in axial direction 4 through window-like recesses 94 in inner radial section 46 of second component 22 to achieve the rotary driving connection with second component 22, wherein recesses 94, likewise support fingers 92, are spaced apart from one another in circumferential direction 12, 14.

As already previously indicated, annular base section 90 is designed as one piece with pressure plate 74, wherein pressure plate 74 in the embodiment shown is analogously formed by a section of base section 90 elongated outward in radial direction 8. Alternatively, however, pressure plate 74 may be designed as separate from second force transmission element 82 and be supported or supportable on the same.

As is clear in the FIGURE, support fingers 92 of second force transmission element 82 are supported or supportable on annular base section 84 of first force transmission element 80. It should, however, be mentioned at this point, that a configuration is basically also considered here, in which two base sections 84, 90 of first and second force transmission elements 80, 82 are supported or supportable on one another. In this case, it would be preferred to design pressure plate 74 as separate from second force transmission element 82.

A friction element 96 is arranged between first force transmission element 80 and second force transmission element 82 in axial directions 4, 6. Friction element 96 functions to reduce wear on force transmission elements 80, 82 supporting themselves on one another and also to increase the friction between force transmission elements 80, 82 when they, together with components 20, 22, vibrate or are rotated in circumferential direction 12, 14 relative to one another. Friction element 96 may thereby be designed basically as separate from the two force transmission elements 80, 82; however, it is preferred if friction element 96 is fixed on first force transmission element 80 or on second force transmission element 82. In the embodiment shown, the fixing on annular base section 84 of first force transmission element 80 is preferably used; however, it is likewise possible to fixe friction element 96 on the ends of support fingers 92 of second force transmission element 82, wherein in this case, friction elements pieces may be provided separated from one another. Friction element 96 is preferably a friction lining or a paper friction lining, wherein an adhesive fixing on the respective force transmission element 80, 82 is particularly preferred.

To counteract wear on first force transmission element 80 and on actuating element 56 of actuating device 52, a sliding element 98 is provided in axial direction 4, 6 between first force transmission element 80 and actuating element 56. Sliding element 98 does not only have a wear-reducing function; instead, sliding element 98 is also to be selected in such a way that it reduces friction between first force transmission element 80 and actuating element 56 when these contact via sliding element 98 and are rotated in circumferential direction 12, 14 relative to one another. Sliding element 98 may thereby be designed as separate both from first force transmission element 80 and also from actuating element 56; however, it is preferred if sliding element 98 is fixed, as shown in the FIGURE, on first force transmission element 80 or on actuating element 56. The former variant is shown in the FIGURE.

In general, both device 54 to be actuated in the form of clutch device 64, force transmission device 26, reset device 76, and actuating device 52 are arranged within a common wet space 100 so that it may also be stated that clutch device 64 is a wet-running clutch device 64 and that torsional vibration damper 18 is also a wet-running torsional vibration damper 18.

Additional features of torsional vibration damper 18 or arrangement 2 and their functions are subsequently described with reference to the FIGURE.

If output side 30 of the internal combustion engine is driven while clutch device 64 is located in the previously mentioned first operating state, in which clutch device 64 is closed, then the torque generated by the internal combustion engine is guided via torsional vibration damper 18 and clutch device 64, the torsional or rotational vibrations being damped, to an output side 102 of arrangement 2 where said torque functions to drive a subsequent component within the drivetrain. Reset device 76 thereby effects the biasing of clutch device 64 into the first operating state, in which clutch device 64 is closed, while actuating element 56 is located in the starting position shown in the FIGURE due to the biasing by spring element 52, in which starting position no contact exists between actuating element 56 and first force transmission element 80 of force transmission device 26.

Basically, actuating element 56 may, however, already be in contact with first force transmission element 80 via sliding element 98 to avoid larger displacement paths of actuating element 56 during the later actuation of clutch device 64; however, to exclude friction between actuating element 56, stationary in circumferential direction 12, 14 and first force transmission element 80, moving in circumferential direction 12, 14, from influencing the rotational movement of first component 20 of torsional vibration damper 18, actuating element 56 is biased in its starting position in the manner described.

To translate clutch device 64 from its first operating state, in which clutch device 64 is closed, into the second operating state, in which clutch device 64 is open, for example, to decouple the internal combustion engine from the drivetrain in favor of an electric motor in a drivetrain for a hybrid vehicle, actuating device 52 must apply an actuating force in axial direction 6 which overcomes the counteracting reset force of reset device 76. Consequently, the reset force acting in axial direction 4 analogously represents a predetermined actuating force threshold value, as will be subsequently explained in greater detail.

If a hydraulic force is applied to hydraulic actuating device 52, then actuating element 56, in the form of the actuating piston, is pressed in axial direction 6 against force transmission device 26 counter to the force of spring device 52. In other words, the actuating force is applied to first force transmission element 80 via sliding element 98, while the actuating force is applied to second force transmission element 82 via first force transmission element 80 to transmit the actuating force to pressure plate 74—designed here as one piece with second force transmission element 82—of clutch device 64. If the actuating force is greater, in terms of amount, than the previously mentioned actuating force threshold value, then pressure plate 74 is displaced in axial direction 6 counter to the reset force of reset device 76 and clutch device 64 is translated into the second operating state, in which clutch device 64 is open. In addition, due to the actuating force acting between first and second force transmission elements 80, 82, friction occurs between first force transmission element 80 and second force transmission element 82 when these, together with respective components 20, 22 of torsional vibration damper 18, rotate relative to one another in circumferential directions 12, 14 or vibrate. In other words, force transmission device 26 interacts in such a way with first and second components 20, 22 of torsional vibration damper 18 that the actuating force is applied to force transmission device 26, while impeding a relative rotation between first and second components 20, 22, wherein the specified relative rotation between first and second components 20, 22 caused by friction, in this case due to the friction between first and second force transmission elements 80, 82, is impeded.

Consequently, force transmission device 26 has the function of transmitting the actuating force from actuating device 52 to device 54 to be actuated, in the form of clutch device 64, while it also has the function of influencing the vibration behavior of torsional vibration damper 18. The latter function thus obviates the need for an additional and, if necessary controllable, friction device for influencing the operating performance of torsional vibration damper 18, which leads to a particularly compact structure of torsional vibration damper 18. Such an additional friction device may at least be designed as significantly smaller or essentially reduced to the function of an axial support of first and second components 20, 22 on one another, as this is indicated in the FIGURE by way of support element 104, for example, a support or securing ring between inner radial section 28 of first component 20 and inner radial section 46 of second component 22. Impeding the relative rotation between first and second component 20, 22 may lead to an impedance of the relative rotation up to a prevention of the relative rotation between first and second components 20, 22 at an actuating force above the predetermined actuating force threshold value.

Force transmission device 26 may, however, also influence the operating performance of torsional vibration damper 18 even when clutch device 64 is not to be translated into the second operating state, in which clutch device 64 is open. In this case, actuating device 52 merely has to apply an actuating force in axial direction 6 which is lower than the predetermined actuating force threshold value. By this means, clutch device 64 remains in its first, closed operating state due to the greater reset force of reset device 76; the friction between first force transmission element 80 and second force transmission element 82 is, however, increased due to the still acting actuating force so that the relative rotation is impeded between first and second components 20, 22 of torsional vibration damper 18, and thus its operating performance is influenced. Consequently, it is preferred to provide a control device in arrangement 2 for targeted control of the hydraulic pressure for actuating device 52, and thus for targeted control of the actuating force.

REFERENCES

2 Arrangement
4 Axial direction
6 Axial direction
8 Radial direction
22 Radial direction
12 Circumferential direction
14 Circumferential direction
16 Axis of rotation
18 Torsional vibration damper
20 First component
22 Second component
25 Spring device
26 Force transmission device
28 Inner radial section
30 Output side
32 Axial section
34 Outer radial section
36 Accommodation housing
38 Accommodation space
40 Outer radial section
42 Axial section
44 Support part
46 Inner radial section
48 First axial side
50 Second axial side
52 Actuating device
54 Device
56 Actuating element
58 Cylinder
60 Housing
62 Spring device
64 Clutch device
66 Output side
88 Disk set
70 Inner disk carrier
72 Outer disk carrier
74 Pressure plate
76 Reset device
78 Support ring
80 First force transmission element
82 Second force transmission element
84 Base section
86 Support fingers
88 Recesses
90 Base section
92 Support fingers
94 Recesses
96 Friction element
98 Sliding element
100 Wet space
102 Output side
104 Support element

The invention claimed is:

1. A torsional vibration damper (18) comprising a first component (20) and a second component (22) which are torsionally elastically coupled to one another, characterized in that a force transmission device (26) is provided for transmitting an actuating force from one axial side (48) of the torsional vibration damper (18) to an opposite axial side (50) of the torsional vibration damper (18) to a device (54) to be actuated and characterized in that the force transmission device (26) has a first force transmission element (80), which is displaceable relative to the first component (20) and is in rotary driving connection with the first component (20), and a second force transmission element (82), which is designed as separate from the first force transmission element (80) and is supported or supportable on the first force transmission element (80), and is displaceable relative to the second component (22) and is in rotary driving connection with the second component (22), wherein relative rotation between the first and second components (20, 22) is impeded by friction between the first and second force transmission elements (80, 82).

2. The torsional vibration damper (18) according to claim 1, characterized in that the force transmission device (26) interacts with the first and second components (20, 22) in such a way that the actuating force is applicable to the force transmission device (26) while impeding a relative rotation between the first and second components (20, 22).

3. The torsional vibration damper (18) according to claim 2, characterized in that the relative rotation is impeded by friction between the first and second components (20, 22).

4. The torsional vibration damper (18) according to claim 1, characterized in that a friction element (96) is arranged between the first force transmission element (80) and the second force transmission element (82).

5. The torsional vibration damper (18) according to claim 1, characterized in that a sliding element (98) is provided via which the actuating force is applicable to the first force transmission element (80), wherein the sliding element (98) is fixed on the first force transmission element (80).

6. The torsional vibration damper (18) according to claim 5, characterized in that the sliding element (98) is formed by a sliding lining.

7. The torsional vibration damper (18) according to claim 1, characterized in that the first force transmission element (80) extends through window-like recesses (88), which are spaced apart from one another in circumferential direction (12, 14), in the first component (20) to achieve the rotary driving connection and/or that the second force transmission element (82) extends through window-like recesses (94), which are spaced apart from one another in circumferential direction (12, 14), in the second component (22) to achieve the rotary driving connection.

8. The torsional vibration damper (18) according to claim 7, characterized in that the first force transmission element (80) has an annular base section (84) and support fingers (86) arranged on the base section (84) and extending in axial direction (4, 6) through the recesses (88) in the first component (20), and/or the second force transmission element (82) has an annular base section (90) and support fingers (92) arranged on the base section (90) and extending in axial direction (4, 6) through the recesses (94) in the first component (22).

9. The torsional vibration damper (18) according to claim 8, wherein the base sections (84, 90) of the force transmission elements (80, 82) are supported or supportable on one another, or the support fingers (86; 92) of the one force transmission element (80; 82) are supported or supportable on the base section (90; 84) of the other force transmission element (82; 80).

10. An arrangement (2) for the drivetrain of a motor vehicle comprising a torsional vibration damper (18) according to claim 1 and an actuating device (52) which is arranged on a first axial side (48) of the torsional vibration damper (18) to apply an actuating force to the force transmission device (26), and/or to a device (54) to be actuated which is arranged on a second axial side (50) of the torsional vibration damper (18) and to which an actuating force is transmittable via the force transmission device (26).

11. The arrangement (2) according to claim 10, characterized in that the device (54) to be actuated is translatable from a first operating state into a second operating state, wherein an actuating force below a predetermined actuating force threshold value is applied to the force transmission device (26) to impede a relative rotation between the first and second components (20, 22) and to maintain the first operating state of the device (54) to be actuated, and an actuating force is applied above the predetermined actuating force threshold value to impede the relative rotation between the first and second components (20, 22) and to achieve the second operating state of the device (54) to be actuated.

12. The arrangement (2) according to claim 11, characterized in that a reset device (76), which generates a reset force for biasing the device (54) to be actuated in the first operating state and counteracting the actuating force, is assigned to the device (54) to be actuated and/or to the force transmission device (26), wherein the predetermined actuating force threshold value corresponds in terms of amount to the value of the reset force.

13. The arrangement (2) according to claim 10, characterized in that the device (54) to be actuated is a disk clutch and/or a clutch device (64) for selective torque transmission between the first or second component (20; 22) and an output side (66) of the clutch device (64), wherein the clutch device (64) is closed in the first operating state and open in the second operating state, and/or is arranged in a common wet space (100) with the torsional vibration damper (18).

14. The arrangement (2) according to claim 10, characterized in that the actuating device (52) has an actuating element (56) which is drivable and interacts with the force transmission device (26), wherein the actuating element (56) is stationary in circumferential direction (12, 14) and a sliding element (98) is fixed on the actuating element (56).

15. The arrangement (2) according to claim 14, characterized in that the actuating element (56) is a hydraulically drivable actuating piston or actuating ring piston and the actuating element (56) is drivable and interacts with the first force transmission element (80).

16. The torsional vibration damper (18) according to claim 1, characterized in that a friction element (96) is fixed on the first or second force transmission element (80; 82).

17. The torsional vibration damper (18) according to claim 16, characterized in that the friction element (96) is formed from a friction lining.

* * * * *